United States Patent [19]

Stift et al.

[11] 4,407,864

[45] Oct. 4, 1983

[54] PROCESS FOR TREATING IRON SPONGE

[75] Inventors: Kurt Stift; Horst Sulzbacher, both of Leoben; Günther Saiger, Trofaiach, all of Austria

[73] Assignee: Voest-Alpine Aktiengesellschaft, Vienna, Austria

[21] Appl. No.: 307,577

[22] Filed: Oct. 1, 1981

[30] Foreign Application Priority Data

Oct. 1, 1980 [AT] Austria ............................... 4904/80

[51] Int. Cl.³ .............................................. B05D 7/00
[52] U.S. Cl. ..................................... 427/216; 75/256; 75/3
[58] Field of Search .................... 427/216; 106/14.14, 106/14.44; 75/256, 3

[56] References Cited

U.S. PATENT DOCUMENTS

| | | | |
|---|---|---|---|
| 3,561,999 | 2/1971 | Iannicelli | 427/220 |
| 3,690,936 | 9/1972 | Mueller | 427/216 |
| 4,254,167 | 3/1981 | Sulzbacher | 427/216 |

FOREIGN PATENT DOCUMENTS

| | | | |
|---|---|---|---|
| 897506 | 3/1972 | Canada | 427/216 |
| 721467 | 1/1955 | United Kingdom | |
| 728698 | 4/1955 | United Kingdom | 427/220 |

*Primary Examiner*—Sam Silverberg
*Attorney, Agent, or Firm*—Cushman, Darby & Cushman

[57] ABSTRACT

In a process for treating porous iron-containing particles, in particular iron sponge, performed for preventing reoxidation and/or corrosion during storage and transport it is proposed to roll the iron sponge particles in dust-shaped calcined lime stone (lime dust) and then to humidify the particles with an amount of water which is smaller than required for completely hydrating the calcined lime stone. Hydrophobing additives such as stearates, oleates, paraffins, oils, soaps or waste materials containing fats and soaps are added to the dust-shaped calcined lime stone, said hydrophobing additives being preferably added to the slaking water in form of water-soluble compounds such as ammonium stearate. The hydrophobic additives can be mixed with the calcined lime stone and optionally iron oxide dust. The process can also be performed such that two coatings are applied to the iron sponge particles to be treated in which case the hydrophobing additives are added within the second coating only.

10 Claims, 1 Drawing Figure

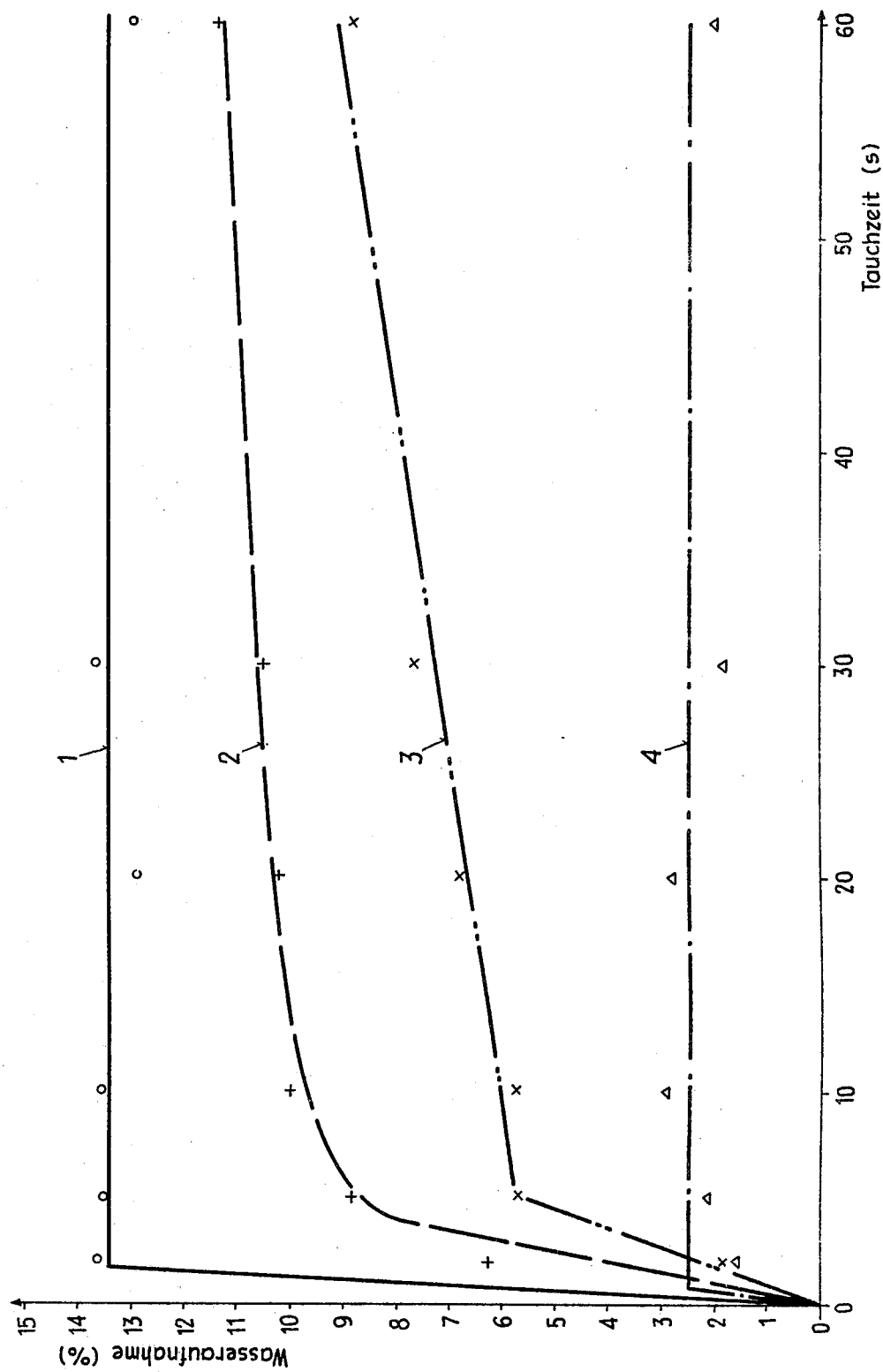

PROCESS FOR TREATING IRON SPONGE

The invention refers to a process for treating porous iron-containing particles, in particular iron sponge, for preventing reoxidation and/or corrosion on storate and transport, said process comprising rolling the iron sponge particles in calcined lime dust subsequently to the production of iron sponge and then humidifying said particles with an amount of water which is smaller than required for completely hydrating the lime. Such a process has, for example, become known from the AT-PS 350 600. This known process was intended to keep low the reduction in quality of the metallized product during storage and transport. The criterion selected for judging the quality of iron sponge is the degree of metallization (Fe metallic/ Fe total) and according to this criterion any reoxidation of the iron sponge shall be kept as low as possible. Per each percent of loss in the degree of metallization, an additional expenditure of about 15 KWh per ton iron sponge is required, so that energy can be saved by increasing the quality of the iron sponge.

It is known that iron sponge obtained by reducing pelletized ores via the gaseous phase has a very high pore volume and that these pores enhance by their capillary action a rapid and strong water absorption. Tests have shown that iron sponge immersed in water sucks up water approximately to saturation which can amount to a maximum of 20 percent. A protective layer containing lime and applied to the surface of the particles results in a reduction of the capacity and of the speed of water absorption but does not result in a distinct improvement on a long duration of the action of water.

Water is enhancing corrosion and reoxidation in particular together with oxygen. By applying a protective layer containing lime, the detrimental effect of water can be reduced but it cannot be prevented that the iron sponge obtains, on extended storage on ambient conditions including rainfall and snowfall, a water content coming close to the saturation limit. Such a high degree of water absorption again results in additional expenditure and increased energy consumption during the melting process, noting that an informative value for the increase in energy consumption per 1 percent humidity and 1 metric ton of charged material is 20 KWh. This calculation applies, for example, when charging electric arc furnaces and results with only 5 percent humidity and with a charge containing 50 percent scrap material and 50 percent iron sponge in an increase of more than 10 percent in energy consumption. This calculation considers only the additional expenditure in energy required for high temperature gasification and the losses resulting by thus unavoidably prolonging the melting period must be added.

It is an object of the invention to provide a process of the type initially mentioned and allowing to reduce the water absorbing capacity of porous iron-containing particles, particularly iron sponge. For solving this task, the invention essentially consists in that hydrophobing additives such as stearates, oleates, paraffins, oils, soaps and waste materials containing fats and soaps are added to the calcined lime. By such hydrophobing additives, penetration of humidity, in particular atmospheric precipitates such as rain and snow, can substantially be reduced, thus not only reducing water absorption but also the danger of any reoxydation of the iron sponge particles. Also the thickness of the layer applied can be reduced as compared with known processes and the introduction of foreign matter can thus be reduced by such a protective layer. The hydrophobing additives react with lime under formation of hydrophobic substances. It is not imperative to incorporate into the coating hydrophobic substances. Formation of such hydrophobic substances can be achieved by reacting additives which are preferably soluble in water. The additives can be added to the water used for partially hydrating the calcined lime stone and can be added to the hydrating water in the form of water-soluble stearates such as, for example, ammonium stearate. Ammonium stearate reacts with calcined lime stone under formation of water-in-soluble calcium stearate which forms a water-repellent protection for the iron sponge particles.

The term "hydrophobing additives" means, according to the invention, all those materials which have water-repellent properties or result in combination with lime in water repellent properties. Particularly suitable materials are stearates, oleates, paraffins, oils, soaps, waste materials containing fats and soaps and the like. Such additives provide the possibility to partially or completely substitute the addition of iron oxides, in particular iron oxides obtained in the surface blowing process, used for improving the adhesive property of the lime dust, because such additives may simultaneously act as an adhesion promotor. In view of most of such hydrophobing additives being carbon containing materials, charging of such additives into the melting furnace is not disadvantageous with respect to the energy consumption.

The process according to the invention can also be performed such that the additives are mixed with calcined lime stone (lime) and optionally with iron oxide dust and are applied to a first coating of calcined lime stone and optionally iron oxide dust, said first coating having been partially slaked with water, whereupon a further partial hydrating step is performed.

According to the invention, the hydrophobing additives are added in an amount of 0.01 to 5 percent by weight based on the weight of the coating. It has been found that a coating applied in an amount of 2 to 10, particularly 3 to 6, percent by weight of the weight of the iron sponge particles is sufficient to reduce the water absorbing capacity and the speed of water absorption to an extent of approximately 20 percent. The water absorption can, however, completely be suppressed by hydrophobing additives.

The hydrophobing substances added to the hydrating water or slaking water can be sprayed onto the surface of the particles coated with the calcined lime stone (lime) together with the hydrating water or slaking water, the amount of water being selected such that hydration of the calcined lime be incomplete, particularly in an amount that the degree of hydration is not more than 80 percent.

The invention is further illustrated with reference to the drawing showing comparative tests and diagrammatically representing the water absorption in percent in dependence on the immersion time (seconds) of iron sponge particles (directly reduced iron —DRI).

The curve designated 1 represents the water absorption of untreated iron sponge. The curve 2 represents the water absorption of iron sponge particles coated with lime (CaO) only. Curve 3 represents the water absorption of iron sponge particles treated according to the invention and which have been impregnated with ammonium stearate being present in the lime mixture in an amount of approximately 0.25 percent.

Curve 4 shows the water absorption of particles coated according to the invention and containing 3 percent calcium stearate within the lime mixture.

What is claimed is:

1. Process for treating porous iron-containing particles, in particular iron sponge, for preventing reoxidation and/or corrosion on storage and transport, said process comprising rolling the iron sponge particles in calcined lime dust subsequently to the production of iron sponge and then humidifying said particles with an amount of hydrating water which is smaller than required for completely hydrating the lime, characterized in that hydrophobing additives are added to the calcined lime by adding said substances to the hydrating water.

2. Process as claimed in claim 1 wherein said additives are water-soluble.

3. Process as claimed in claim 1, characterized in that the additives are mixed with calcined lime stone and are applied to a first coating of calcined lime stone, said first coating having been partially slaked with water, whereupon a further partial hydrating step is performed.

4. Process as claimed in claim 1, characterized in that the hydrophobing additives are added in an amount of 0.01 to 5 percent by weight based on the weight of the coating.

5. Process as claimed in claim 1, characterized in that the total weight of the coating is selected to amount to 0.05 to 10 percent by weight, of the weight of the iron sponge.

6. A process as in claim 2 wherein the additives are selected from the group consisting of stearates, oleates, paraffins, oils, soaps and waste materials containing fats and soaps.

7. A process as in claim 2 wherein the additive is ammonium stearate.

8. A process as in claim 1 wherein the total weight of the coating is 2 to 6 percent by weight of the iron sponge.

9. A process for treating iron sponge particles to reduce their tendency to absorb moisture comprising: rolling the iron sponge particles in solid particulate material containing predominantly calcined lime dust to thereby form a coating on the particles and subsequently humidifying the coated particles by applying thereto liquid water containing at least one water-soluble dissolved hydrophobing additive, the amount of additive being 0.01 to 5 percent by weight based on the weight of the coating and the amount of water being smaller than the amount required for complete hydration of the lime.

10. A process as in claim 9 wherein the additive is a water-soluble stearate.

* * * * *